United States Patent [19]
Koiwai et al.

[11] Patent Number: 5,978,160
[45] Date of Patent: Nov. 2, 1999

[54] LENS BARREL HAVING A FLARE DIAPHRAGM WHICH CAN ADVANCE INTO AND RETREAT FROM THE OPTICAL PATH TO ELIMINATE DELETERIOUS LIGHT RESULTING FROM MOVEMENT OF THE LENS

[75] Inventors: Tamotsu Koiwai, Akiruno; Tatsuya Suzuki, Tokyo, both of Japan

[73] Assignee: Olympus Optical Co., Ltd., Tokyo, Japan

[21] Appl. No.: 08/979,642

[22] Filed: Nov. 26, 1997

[30] Foreign Application Priority Data

Nov. 28, 1996 [JP] Japan .................................. H8-326822

[51] Int. Cl.$^6$ ............................. G02B 7/02; G02B 15/14; G02B 9/00
[52] U.S. Cl. ...................... 359/822; 359/704; 359/739; 359/740
[58] Field of Search ................... 359/822, 704, 359/739, 740

[56] References Cited

U.S. PATENT DOCUMENTS 5,373,397  12/1994  Satoh ....................................... 359/694
5,376,983  12/1994  Yamazaki ........................... 354/195.12
5,392,160   2/1995  Satoh ....................................... 359/695

FOREIGN PATENT DOCUMENTS 60-164414  10/1985  Japan .
63-160520  10/1985  Japan .

*Primary Examiner*—Georgia Epps
*Assistant Examiner*—Michael A. Lucas
*Attorney, Agent, or Firm*—Louis Weinstein

[57] ABSTRACT

In a lens barrel, a flare diaphragm is disposed on an optical path of lenses or in the vicinity thereof such that the flare diaphragm can advance into and retreat from the optical path for cutting deleterious light corresponding to the lenses moving in the direction of the optical axis. This lens barrel can reliably cut deleterious light flux in a simple structure.

23 Claims, 15 Drawing Sheets

LENS BARREL HAVING A FLARE DIAPHRAGM WHICH CAN ADVANCE INTO AND RETREAT FROM THE OPTICAL PATH TO ELIMINATE DELETERIOUS LIGHT RESULTING FROM MOVEMENT OF THE LENS

BACKGROUND OF THE INVENTION

1. Field of the Invention

The present invention relates to a lens barrel having means for removing deleterious light in an optical path of a photographic optical system.

2. Related Art Statement

Conventionally, the structure for removing light beams other than those reaching a film exposing plane in an optical path of a photographic optical system incorporated in a lens barrel has been widely known in the art.

For example, Laid-open Japanese Utility Model No. 63-160520 discloses a structure for moving a flare diaphragm forwards and rearwards along the direction of the optical axis with a zoom cam arranged in a zoom lens barrel.

Also, Laid-open Japanese Pat. Application No. 60-194414 discloses a structure which includes a flare diaphragm of a variable diameter so that the diameter of the flare diaphragm is changed on a plane perpendicular to the optical axis.

However, the structure disclosed in the above-mentioned Laid-open Japanese Utility Model No. 63-160520 has a problem in that deleterious light flux cannot be effectively cut since the flare diaphragm moves forwards and backwards along the optical axis.

The structure disclosed in the above-mentioned Laid-open Japanese Pat. Application No. 60-194414, in turn, has a problem in that the size of the entire lens barrel becomes larger because of a large space required to accommodate the flare diaphragm.

OBJECT AND SUMMARY OF THE INVENTION

It is an object of the present invention to provide a lens barrel having a simple structure which is capable of reliably cutting deleterious light flux.

A first lens barrel of the present invention has a flare diaphragm which is disposed on an optical path of lenses or in the vicinity thereof such that the flare diaphragm can advance into and retreat from the optical path for cutting deleterious light corresponding to the lenses moving in the direction of the optical axis.

A second lens barrel of the present invention comprises lenses forming a photographic optical system, a lens holding frame for holding the lenses, which is moved in the direction of the optical axis to perform a focal distance changing operation or a focusing operation for the photographic optical system, and a flare diaphragm advanced into and retreated from a photographic optical path for cutting deleterious light in response to movements of the lens holding frame in the direction of the optical axis.

Other features and advantages of the present invention will become fully apparent from the following description.

DETAILED DESCRIPTION OF THE PREFERRED EMBODIMENTS

A lens barrel according to the present invention will hereinafter be described in connection with several preferred embodiments thereof with reference to the accompanying drawings.

Figure 1:
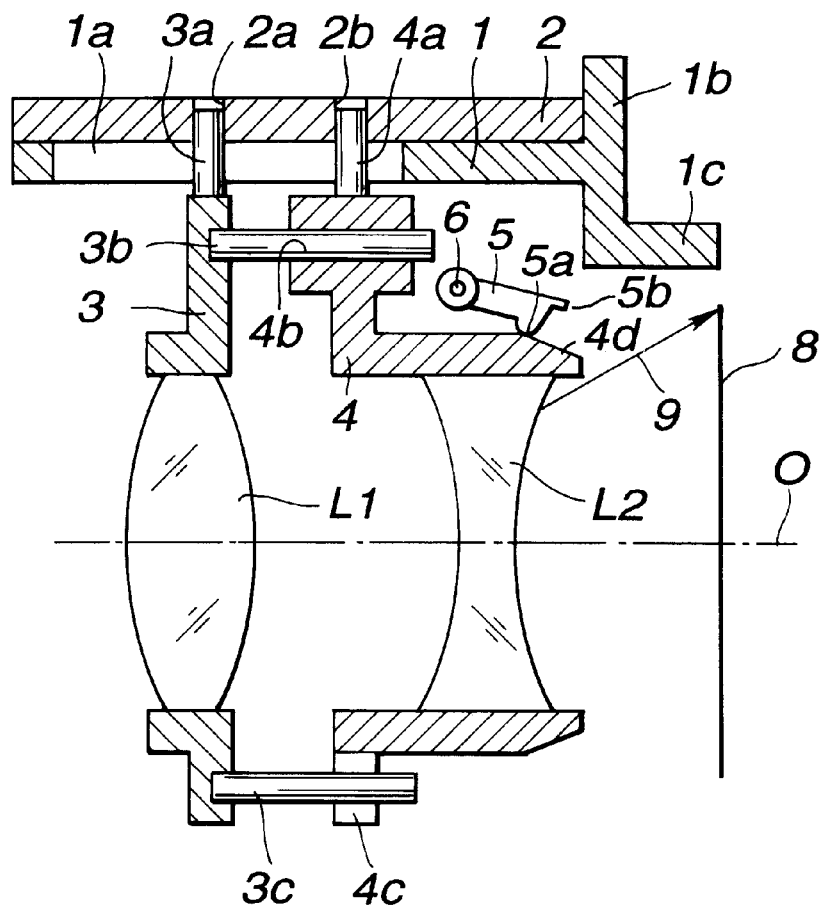
FIG. 1 is a cross-sectional view illustrating a lens barrel according to a first embodiment of the present invention which is in a wide-angle state.
Figure 2:
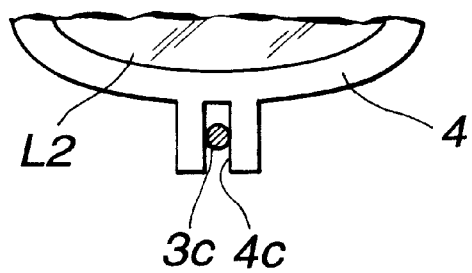
FIG. 2 is an exploded plan view of a portion of the lens barrel illustrated in FIG. 1.
Figure 3:
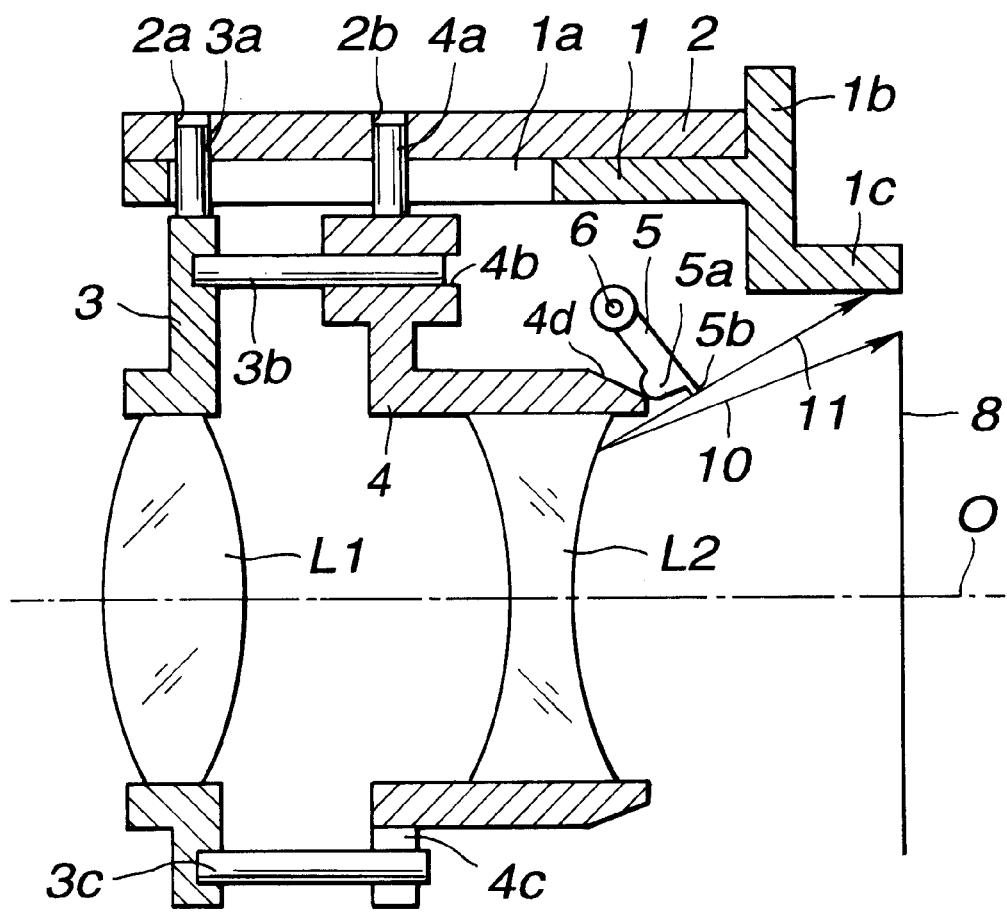
FIG. 3 is a cross-sectional view illustrating the lens barrel shown in FIG. 1 which is in a telephoto state.
Figure 4:
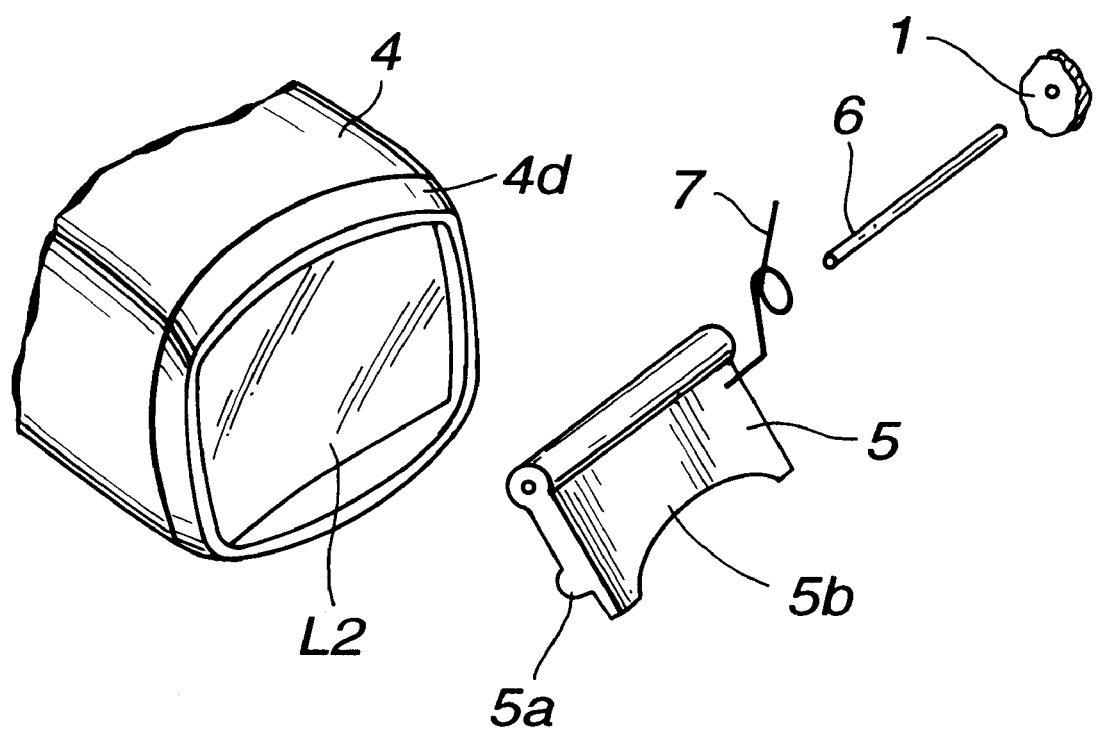
FIG. 4 is an exploded perspective view of a portion of the lens illustrated in FIG. 1.

FIGS. 1–4 are views illustrating a first embodiment of the lens barrel according to the present invention. FIG. 1 is a cross-sectional view illustrating the lens barrel according to the first embodiment of the present invention which is in a wide-angle state; FIG. 2 is an exploded plan view of a portion of the lens barrel; and FIG. 3 is a cross-sectional view of the lens barrel which is in a telephoto state. In addition, FIG. 4 is an exploded perspective view of a portion of the lens barrel.

A camera body, not shown, has a fixed frame 1 fastened thereto for serving as the basis for supporting of a photographic lens. A cam ring 2 is rotatably fitted on the outer periphery of the fixed frame 1 so as to be rotatable about an optical axis O and inhibited from moving in the direction of the optical axis. The cam ring 2 is driven by a driving source, not shown, such as, for example, a motor or the like to rotate about the optical axis relative to the fixed frame 1. Inside the fixed frame 1, a first lens frame 3 and a second lens frame 4 are disposed for forward and rearward movements in the direction of the optical axis. The first lens frame 3 holds a first lens group L1, while the second lens frame 4 holds a second lens group L2.

Cam followers 3a are implanted in the outer periphery of the first lens frame 3. While only one cam follower 3a is illustrated in FIG. 1 for avoiding complicated illustration, there are actually three cam followers (typically equispaced) about the optical axis. Also, cam followers 4a are implanted in the outer periphery of the second lens frame 4, similar to the cam followers 3a in the first lens frame 3. These cam followers 3a, 4a are fitted in first cam grooves 2a and second cam grooves 2b formed through the cam ring 2, respectively, via an elongated groove 1a extending along the direction of the optical axis formed through the fixed frame 1. These first cam grooves 2a and second cam grooves 2b restrict the positions of the first lens frame 3 and the second lens frame 4 in the direction of the optical axis, i.e., the positions of the first lens group L1 and the second lens group L2 in the direction of the optical axis, and the cam followers 3a, 4a are inserted in the elongated groove 1a of the fixed frame 1 to restrict the rotation of the first lens frame 3 and the second lens frame 4 about the optical axis relative to the fixed frame 1.

At the back of the first lens frame 3, a supporting shaft 3b and a rotation stopper shaft 3c are implanted in parallel with the optical axis and extending in the rearward direction. The supporting shaft 3b is axially slidably fitted in a fitting hole 4b formed through the second lens frame 4. Also, as illustrated in FIG. 2, the rotation stopper shaft 3c is slidably fitted into a rotation stopper craw 4c radially disposed in the second lens frame 4. The rotation stopper craw 4c extends in the radial direction and is open at the outer peripheral end.

The supporting shaft 3b guides the second lens frame 4 to linearly advance relative to the first lens frame 3, while the rotation stopper shaft 3c prevents the centers of the first lens frame 3 and the second lens frame 4 from displacing, i.e., prevents the optical axes of the first lens group L1 and the second lens group L2 from mutually displacing in the direction perpendicular to the optical axis.

At the back of the second lens frame 4, a flare diaphragm 5 is rotatably supported by a shaft 6 implanted in the fixed frame 1. The flare diaphragm 5 is urged by a spring 7 (see FIG. 4) about the shaft 6 in the clockwise direction in the drawing. Also, the flare diaphragm 5 has a cam follower 5a which abuts on the outer periphery of the second lens frame 4 and a cam slope 4d. Further, the flare diaphragm 5 is formed at the lower end thereof with an arc-shaped diaphragm edge 5b.

A flange 1b is disposed at the rear end of the fixed frame 1, and at the inner end of the flange 1b on the optical axis side, a reduced diameter portion 1c extending rearwards is formed. This reduced diameter portion 1c has a function of preventing photographic light flux from entering into the camera body. Further, in the camera body, not shown, a film 8 on which the photographic light flux is focused is fed.

In a wide-angle state illustrated in FIG. 1, the first lens frame 3 and the second lens frame 4 are restricted their positions in the direction of the optical axis by the cam followers 3a, 4a and the first cam grooves 2a and the second cam grooves 2b of the cam ring 2, respectively.

In this wide-angle state, the cam follower 5a of the flare diaphragm 5 abuts on the outer periphery of the second lens frame 4. This causes the flare diaphragm 5 to be held in the state illustrated in FIG. 1 against the urging force of the spring 7. Since the diaphragm edge 5b is positioned away from a wide light beam 9 required to form a wide image, emitted from the rear end of the second lens group L2, the wide light beam 9 is focused at a predetermined point on the film 8 without any obstacle.

In this state, the cam ring 2 is rotated by a driving source, not shown, by a predetermined amount relative to the fixed frame 1. This causes the first cam grooves 2a and the second cam grooves 2b formed through the cam ring 2 to rotate relative to the elongated groove 1a formed through the fixed frame 1, so that the cam followers 3a, 4a respectively advance along the optical axis. Simultaneously, the first lens frame 3 and the second lens frame 4 advance integral with the first lens group L1 and the second lens group L2 along the optical axis to a telephoto position illustrated in FIG. 3.

In the telephoto state illustrated in FIG. 3, the first lens frame 3 and the second lens frame 4 are positioned further forward as compared with the wide-angle position. With the advance of the second lens frame 4, its cam surface 4d also advances. Since the flare diaphragm 5 is urged by the spring 7 in the clockwise direction, the cam follower 5a follows the cam surface 4d of the second lens frame 4 to rotate in the clockwise direction, and the diaphragm edge 5b of the flare diaphragm 5 projects toward the optical axis as illustrated in FIG. 3. A telephoto light beam 10 required to form a telephoto image, in the photographic optical system, passes near the lower end of the diaphragm edge 5b as illustrated in FIG. 3 and is focused at a predetermined point on the film 8 without any obstacle.

Here, a deleterious light beam causing a degraded image quality of photograph, when emitted from the rear surface of the second lens group L2, acts as a deleterious light beam 11 illustrated in FIG. 3 if the flare diaphragm 5 is not used, and the deleterious light beam reaches the film 8 after being reflected on the inner surface of the diameter reduced portion 1c. However, since the flare diaphragm 5 is in a posture having a larger angle than in the wide-angle state illustrated in FIG. 3, the deleterious light beam 11 is blocked its course by the diaphragm edge 5b and accordingly does not reach the film 8.

When the photographic optical system is changed from the wide-angle state to the telephoto state, the posture of the flare diaphragm 5 is determined by the cam surface 4d of the second lens frame 4. Stated another way, for passing a photographic light beam but blocking a deleterious light beam, the shape of the cam surface 4d, the shape of the flare diaphragm 5, and the shape and the position of the cam follower 5a may be appropriately changed to be applicable to different types of lens barrels. It goes without saying in this case that shapes and position optimal to a particular lens barrel should be employed.

In the zoom lens of the first embodiment structured as described above, even if the focal distance is changed due to a zooming operation, a photographic light beam required to form an image at each focal distance is passed while a deleterious light beam is reliably blocked, so that high quality photographs can be taken.

Figure 5:
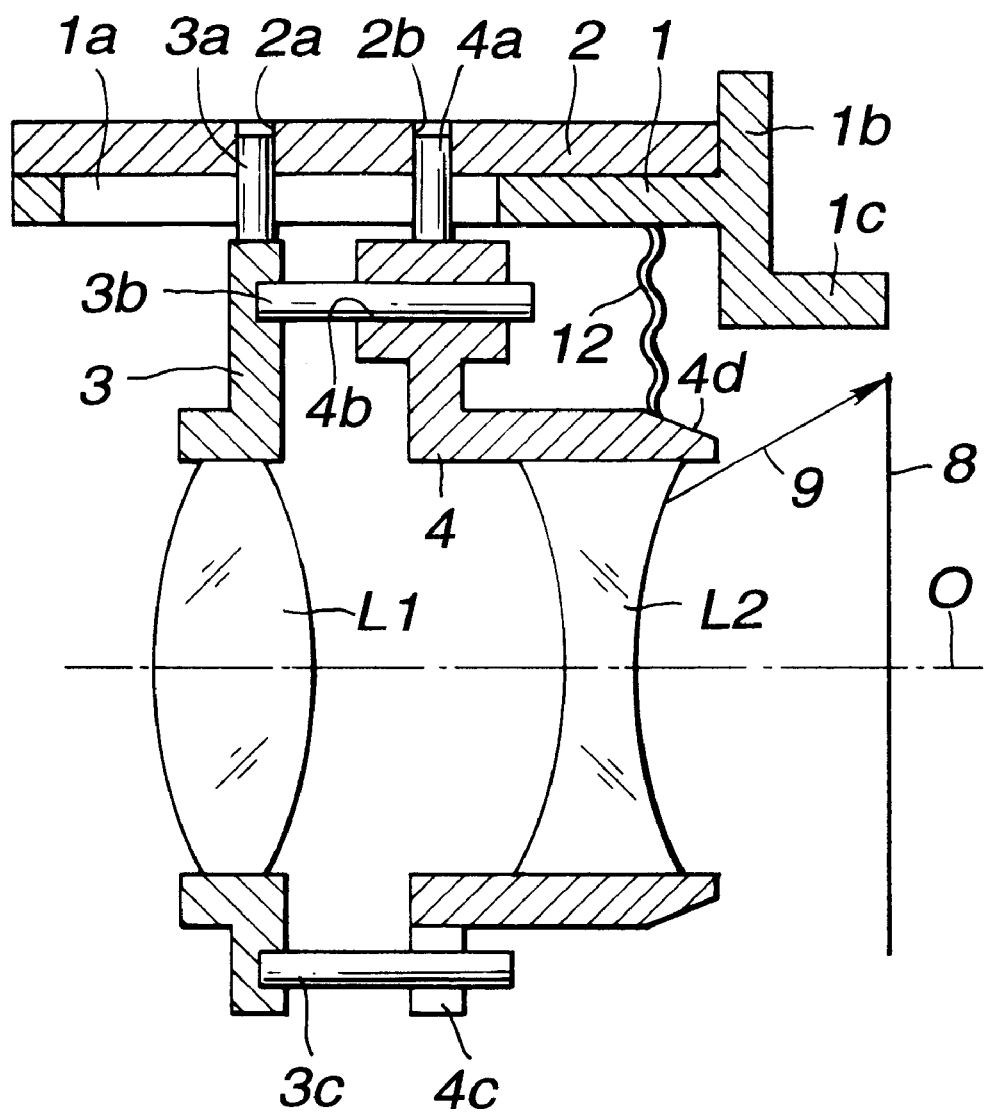
FIG. 5 is a cross-sectional view illustrating a lens barrel according to a second embodiment of the present invention which is in a wide-angle state.
Figure 6:
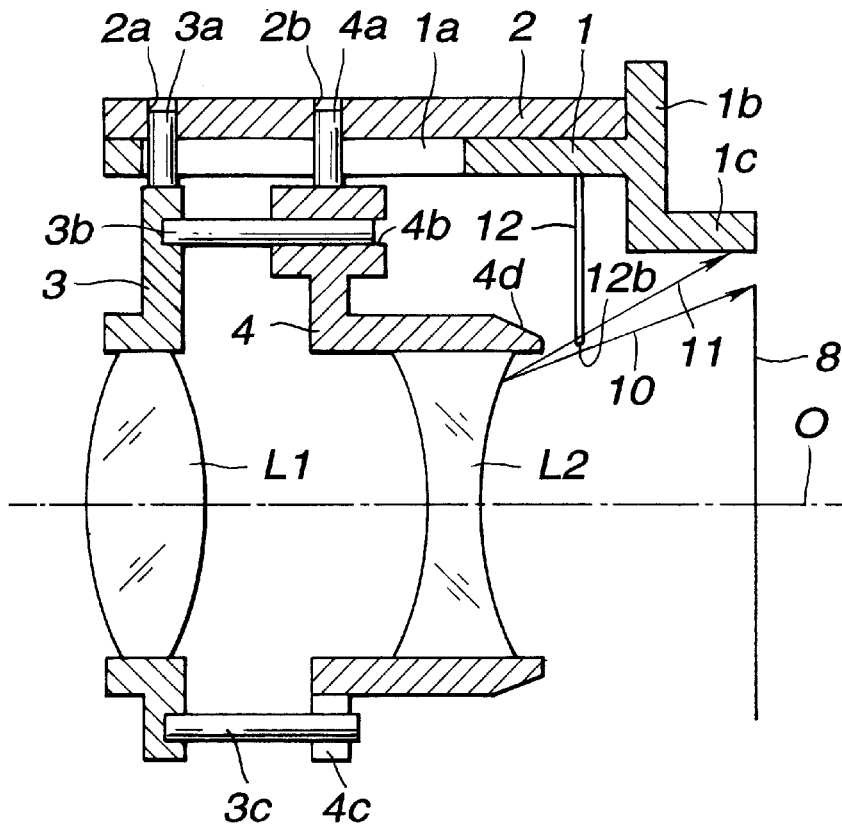
FIG. 6 is a cross-sectional view illustrating the lens barrel shown in FIG. 5 which is in a telephoto state.
Figure 7:
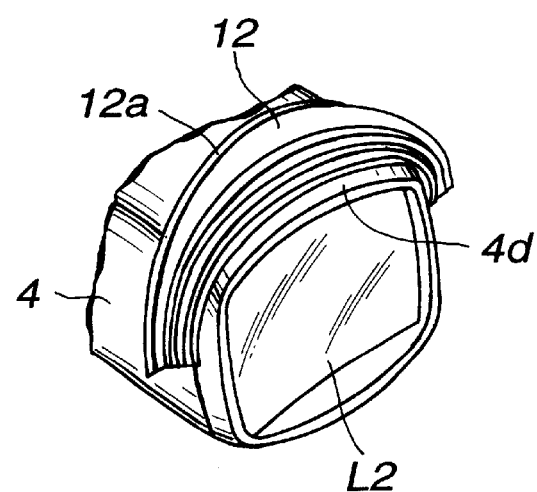
FIG. 7 is an exploded perspective view of a portion of the lens barrel illustrated in FIG. 5 which is in the wide-angle state.
Figure 8:
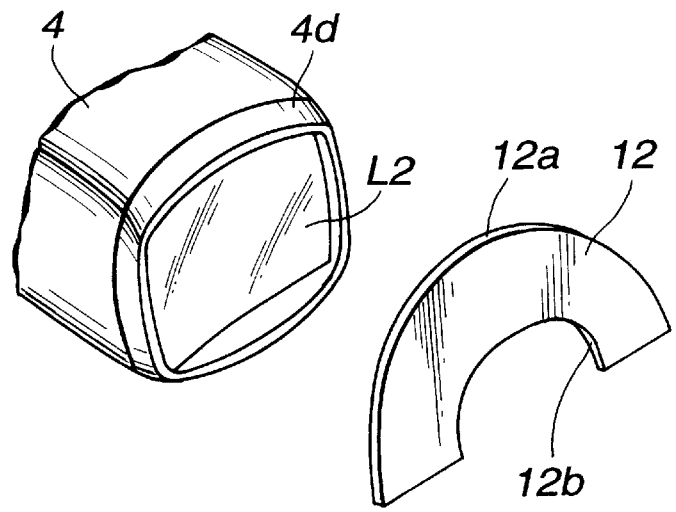
FIG. 8 is an exploded perspective view of the portion of the lens barrel illustrated in FIG. 5 which is in the telephoto state.

Next, a second embodiment of the lens barrel according to the present invention will be described with reference to FIGS. 5–8. FIG. 5 is a cross-sectional view illustrating the lens barrel according to the second embodiment which is in a wide-angle state; FIG. 6 is a cross-sectional view of the same in a telephoto state; FIG. 7 is an exploded perspective view of a portion of the lens barrel in the wide-angle state; and FIG. 8 is an exploded perspective view of the portion of the lens barrel in the telephoto state.

Since the lens barrel according to the second embodiment has substantially the same structure as the aforementioned lens barrel according to the first embodiment, the same members are only designated the same reference numerals, and a detailed description thereof is omitted for the sake of brevity.

A flare diaphragm 12 is formed by a flexible material having light shielding and elastic properties such as silicon rubber or the like. The flare diaphragm 12 is formed in a semicircular hollow disk shape having a flat surface perpendicular to the optical axis O as illustrated in FIG. 8.

The outer periphery 12a of the flare diaphragm 12 is secured to the inner surface of a fixed frame 1. This secured position is opposite to a cam surface 4d when a second lens frame 4 is in a wide-angle position. The flare diaphragm 12 has a free end on the inner peripheral side, and a diaphragm edge 12b is formed at a position nearer to the optical axis beyond the outer periphery of the second lens frame 4.

When the lens barrel is in the wide-angle state, the cam surface 4d of the second lens frame 4 is positioned inside and to the right of the flare diaphragm 12, as illustrated in FIGS. 5 and 7. The cam surface 4d and the outer periphery of the second lens frame 4 deform and enlarge the diaphragm edge 12b of the flare diaphragm 12. In this sate, a wide light beam 9 reaches a predetermined position on a film 8 without any obstacle.

When a cam ring 2 is rotated to advance a first lens frame 3 and the second lens frame 4 to a telephoto position, the cam surface 4d of the second lens frame 4 moves forward from the inside of the flare diaphragm 12, so that the diaphragm edge 12 of the flare diaphragm 12 becomes free.

In this state, while a telephoto light beam 10 can pass inside the diaphragm edge 12b and reach the film 8, a deleterious light beam 11 is blocked by the flare diaphragm 12 so that it cannot reach the film 8.

In the lens barrel according to the second embodiment structured as described above, since the flare diaphragm can be formed of a single sheet-like member, a manufacturing cost can be reduced.

While in the second embodiment, the flare diaphragm 12 is disposed only in an upper half portion of the lens barrel, it goes without saying that one flare diaphragm may be disposed in a lower half portion or two flare diaphragms may be disposed in both of the upper and lower portions.

Figure 9:
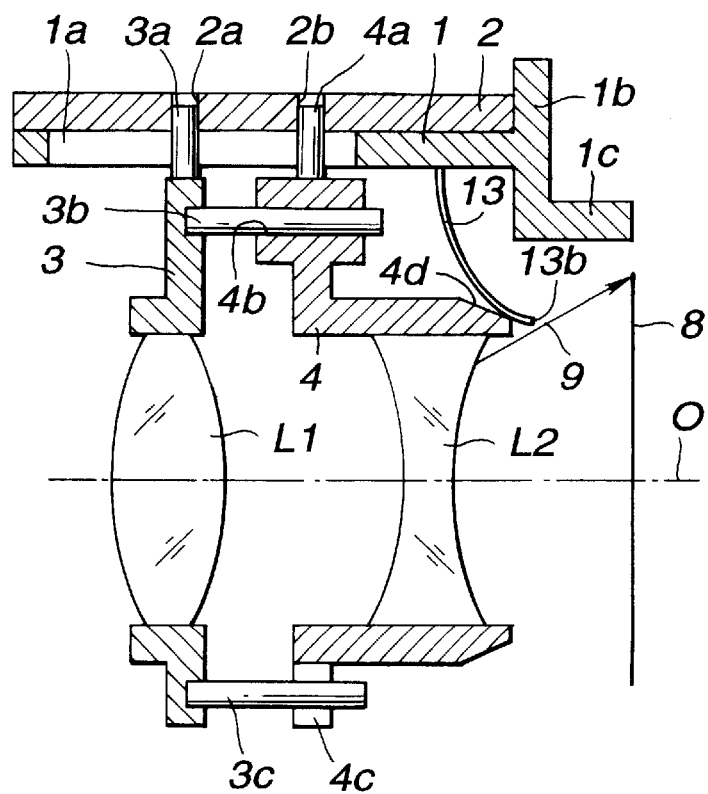
FIG. 9 is a cross-sectional view illustrating a lens barrel according to a third embodiment of the present invention which is in a wide-angle state.
Figure 10:
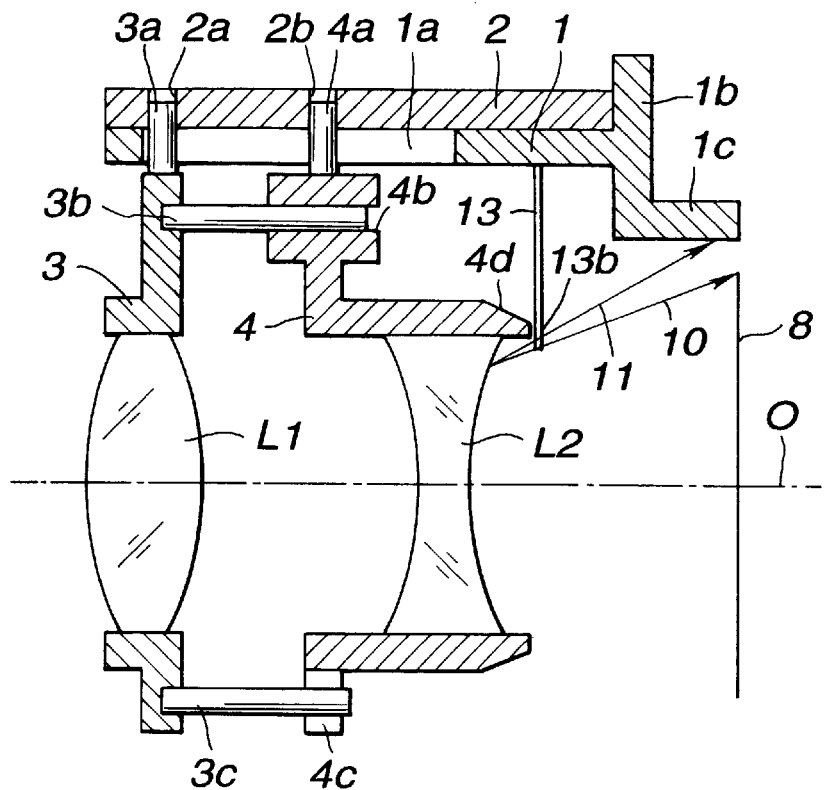
FIG. 10 is a cross-sectional view illustrating the lens barrel shown in FIG. 9 which is in a telephoto state.
Figure 11:
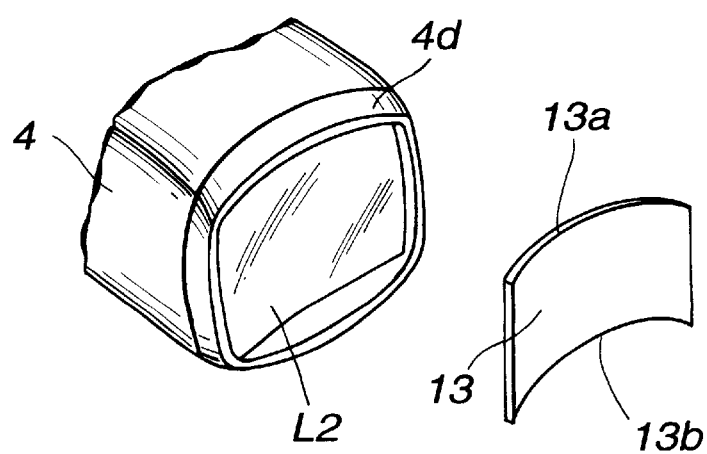
FIG. 11 is an exploded perspective view of a portion of the lens barrel illustrated in FIG. 9 which is in the telephoto state.

Next, a third embodiment of the lens barrel according to the present invention will be described with reference to FIGS. 9–11. FIG. 9 is a cross-sectional view illustrating the lens barrel according to the third embodiment which is in a wide-angle state; FIG. 10 is a cross-sectional view of the lens barrel in a telephoto state; and FIG. 11 is an exploded perspective view of a portion of the lens barrel in the telephoto state.

Since the lens barrel according to the third embodiment has substantially the same structure as the lens barrels of the aforementioned first and second embodiments, the same members are designated by the same reference numerals, and a detailed description thereof is omitted.

A flare diaphragm 13 is formed by a flexible material having light shielding and elastic properties, such as, for example, a black light shielding polyester sheet. The flare diaphragm 13 is formed in a substantially rectangular shape having a flat surface perpendicular to the optical axis O, and arc-shaped upper and lower sides, as illustrated in FIG. 11.

The outer periphery 13a of the flare diaphragm 13 is secured to the inner surface of a fixed frame 1. This secured position is opposite to a cam surface 4d in a second lens frame 4 when the second lens frame 4 is in a wide-angle position. The flare diaphragm 13 has a free end on the inner peripheral side, and a diaphragm edge 13b is formed at a position nearer to the optical axis beyond the outer periphery of the second lens frame 4, when it is free.

When the lens barrel is in the wide-angle state, the second lens frame 4 is positioned inside and to the left of the flare diaphragm 13 as illustrated in FIG. 9. The rear end surface of the second lens frame 4 urges the diaphragm edge 13b of the flare diaphragm 13 rearwards to urge the flare diaphragm 13 into a curved shape such that the diaphragm edge 13b is retreated outside the optical path of the lens. In this state, a wide light beam 9 reaches a predetermined position on a film 8 and is focused thereon without any obstacle.

When a cam ring 2 is rotated to advance a first lens frame 3 and the second lens frame 4 to a telephoto position, the rear end surface of the second lens frame 4 moves forwards beyond the flare diaphragm 13. Thus, the diaphragm edge 13b of the flare diaphragm 13 becomes free.

In this state, while a telephoto light beam 10 can pass inside the diaphragm edge 13b and reach the film 8, a deleterious light beam 11 is blocked by the flare diaphragm 13 and cannot reach the film 8.

In the lens barrel according to the third embodiment structured as described above, since the flare diaphragm 13 can be formed of a single sheet-like member, a manufacturing cost can be reduced.

Figure 19:
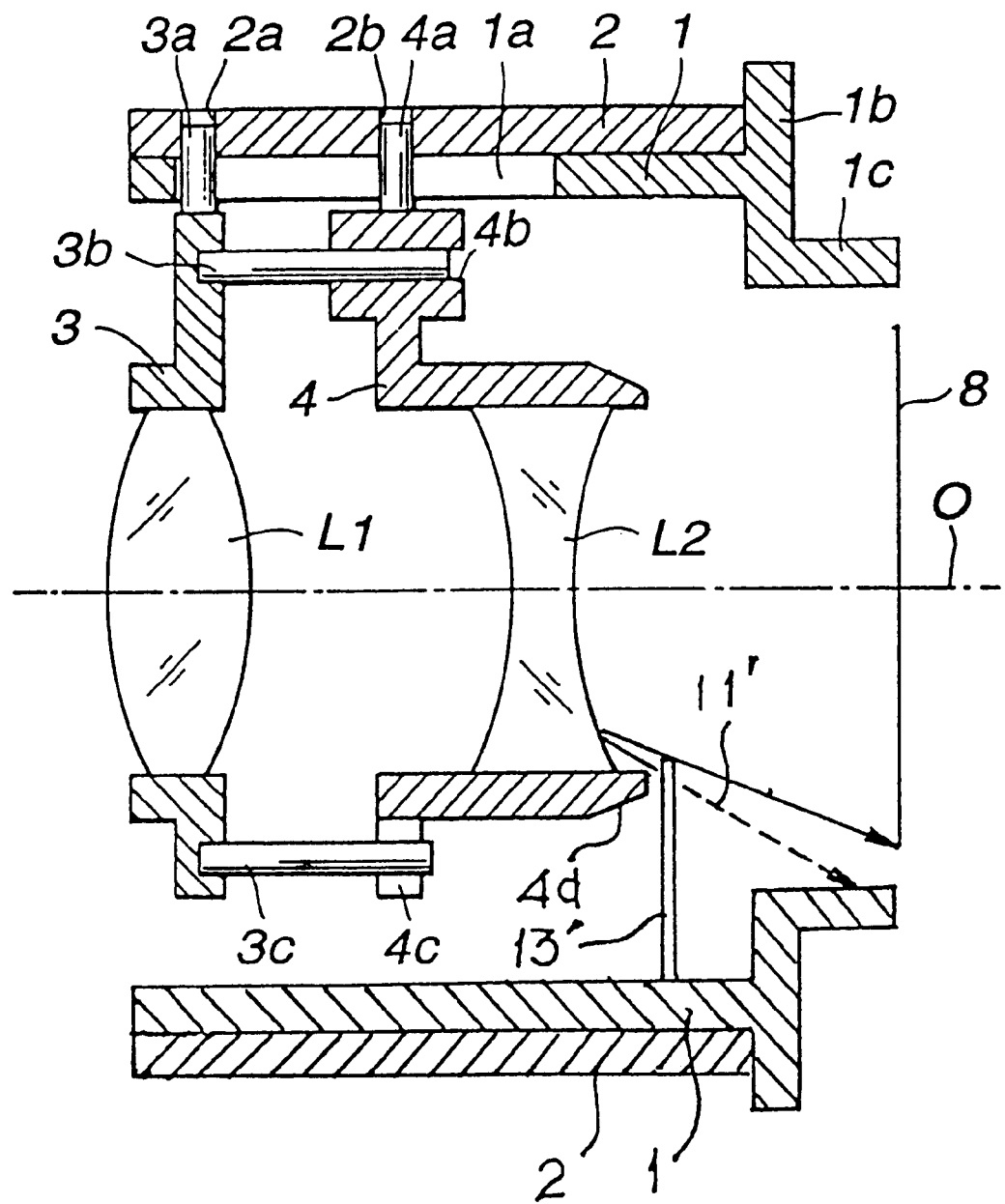
FIG. 19 is a cross-sectional view of a portion of a lens barrel showing an example of the third modified embodiment in which the flare diaphragm is disposed on a lower side of a lens barrel.

FIG. 19 is a modification of the third embodiment showing how deleterious light 11' may be eliminated by flare diaphragm 13' which is disposed on the lower side of the optical axis O.

Figure 12:
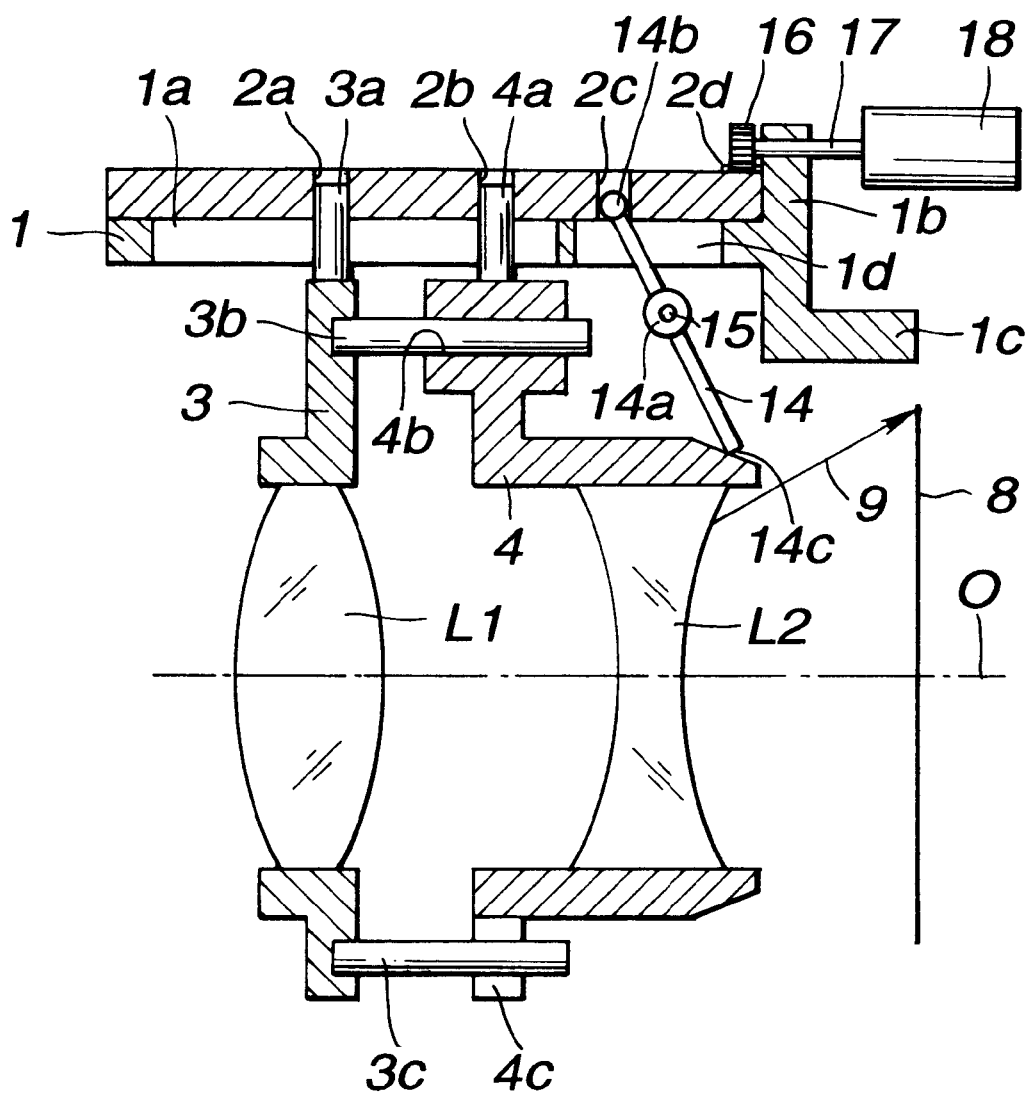
FIG. 12 is a cross-sectional view illustrating a lens barrel according to a fourth embodiment of the present invention which is in a wide-angle state.
Figure 13:
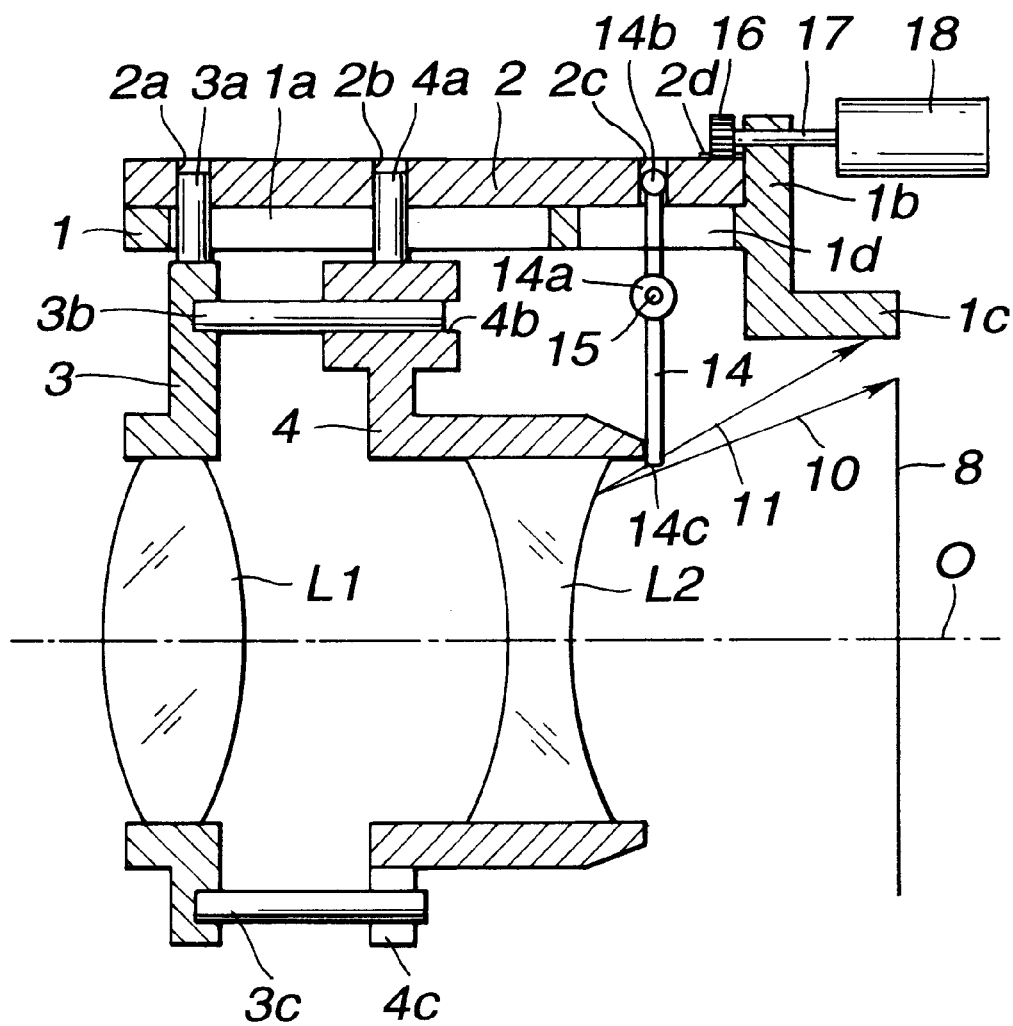
FIG. 13 is a cross-sectional view illustrating the lens barrel shown in FIG. 12 which is in a telephoto state.
Figure 14:
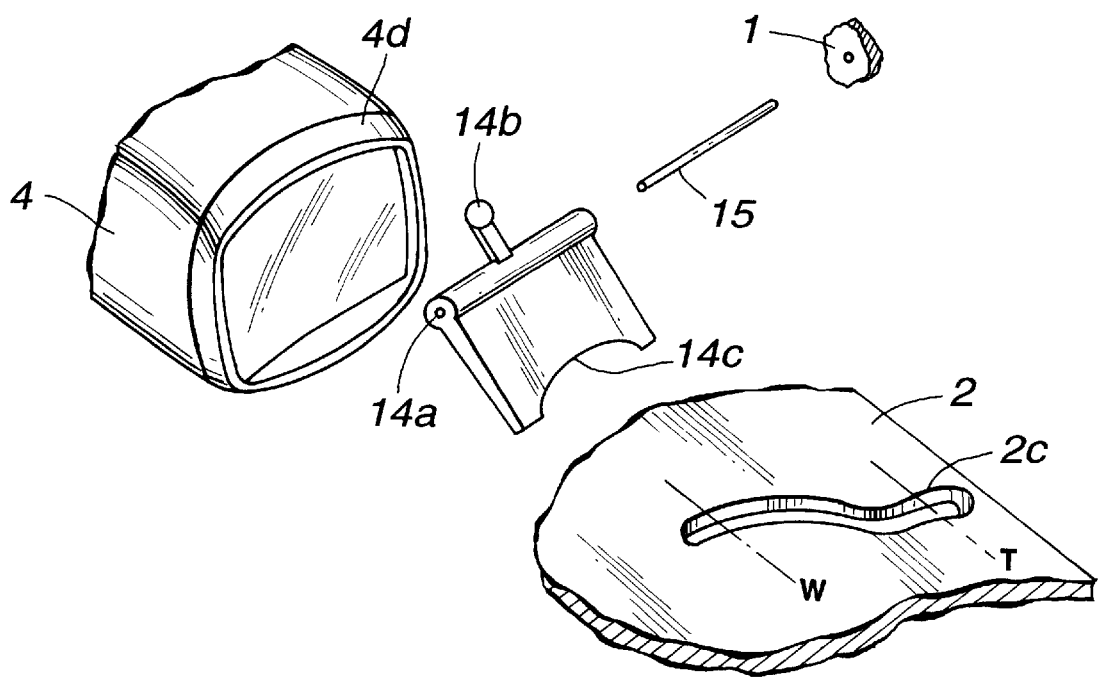
FIG. 14 is an exploded perspective view of a portion of the lens barrel illustrated in FIG. 12.

Next, a fourth embodiment of the lens barrel according to the present invention will be described with reference to FIGS. 12–14. FIG. 12 is a cross-sectional view illustrating the lens barrel according to the fourth embodiment which is in a wide-angle state; FIG. 13 is a cross-sectional view of the lens barrel in a telephoto state; and FIG. 14 is an exploded perspective view of a portion of the lens barrel.

Since the lens barrel according to the fourth embodiment has substantially the same structure as the lens barrels of the aforementioned first—third embodiments, the same members are designated by the same reference numerals, and a detailed description thereof is omitted.

A flare diaphragm 14 has a supporting hole 14a into which a shaft 15 is rotatably inserted. This shaft 15 is fixed to a fixed frame 1, so that the flare diaphragm 14 is rotatably supported by the fixed frame 1. A cam follower 14b of the flare diaphragm 14 is inserted into a flare diaphragm cam 2c of a cam ring 2 through an escape groove 1d formed through the fixed frame 1. In addition, an arc-shaped diaphragm edge 14c as illustrated in FIG. 14 is formed in the flare diaphragm 14 on the side opposite to the cam follower 14b and the supporting hole 14a.

On the outer periphery of the cam ring 2, a gear 2d is disposed along the circumferential direction and is coupled to an output shaft 17 of a zoom motor 18 through a driving gear 16.

The cam follower 14b of the flare diaphragm 14 is positioned at a wide-side end of the flare diaphragm cam 2c of the cam ring 2 as illustrated in FIG. 12. Since the flare diaphragm 14 is rotated about the shaft 15 in the counter-clockwise direction, the diaphragm edge 14c of the flare diaphragm 14 is retreated outside the optical path, where a wide light beam is not blocked. The wide light beam 9 therefore reaches a film 8 without any obstacle.

When the cam ring 2 is rotated by zoom motor 18 to advance the first lens frame 3 and the second lens frame 4 in the direction of the optical axis to the positions indicated in FIG. 13, the lens barrel is in a telephoto state. During this operation, the cam follower 14b of the flare diaphragm 14 is retreated from a wide position indicated by W in FIG. 14 to a telephoto position indicated by T in FIG. 14 in the flare diaphragm cam 2c. This causes the flare diaphragm 14 to rotate about the shaft 15 in the clockwise direction from the state illustrated in FIG. 12 until the diaphragm edge 14c reaches near the rear end surface of the second lens frame 4, as illustrated in FIG. 13.

In this state, a telephoto light beam 10 passes near the lower end of the diaphragm edge 14c and reaches the film 8. However, a deleterious light beam 11 having a large emitting angle is cut by the flare diaphragm 14 and does not reach the film 8.

In this flare diaphragm 14, since the timing of advancing into and retreating from the optical path can be arbitrarily set by the shape of the flare diaphragm cam 2c formed through the cam ring 2, the position of the flare diaphragm 14 can be set in accordance with a change in focal distance, thereby making it possible to more effectively cut deleterious light beams.

Figure 15:
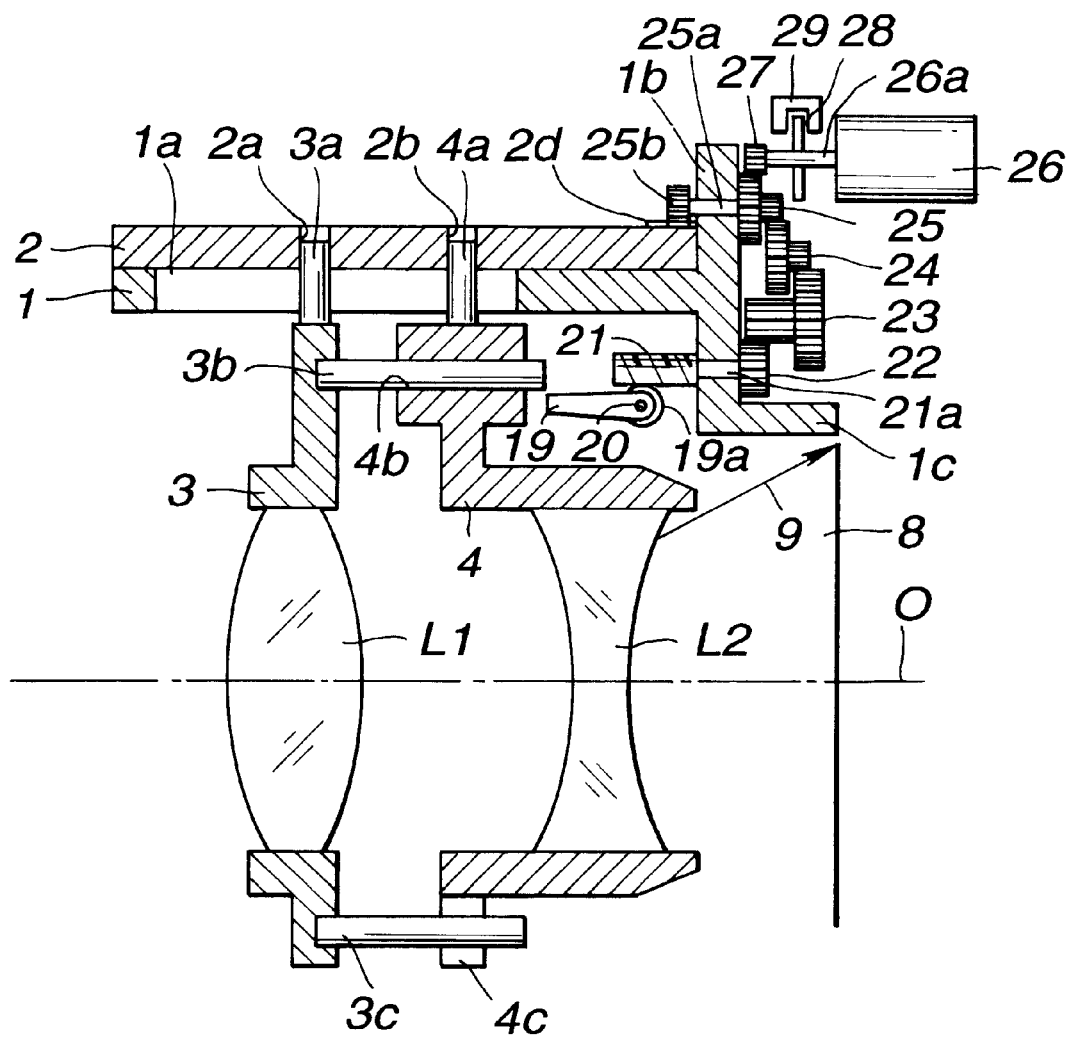
FIG. 15 is a cross-sectional view illustrating a lens barrel according to a fifth embodiment of the present invention which is in a wide-angle state.
Figure 16:
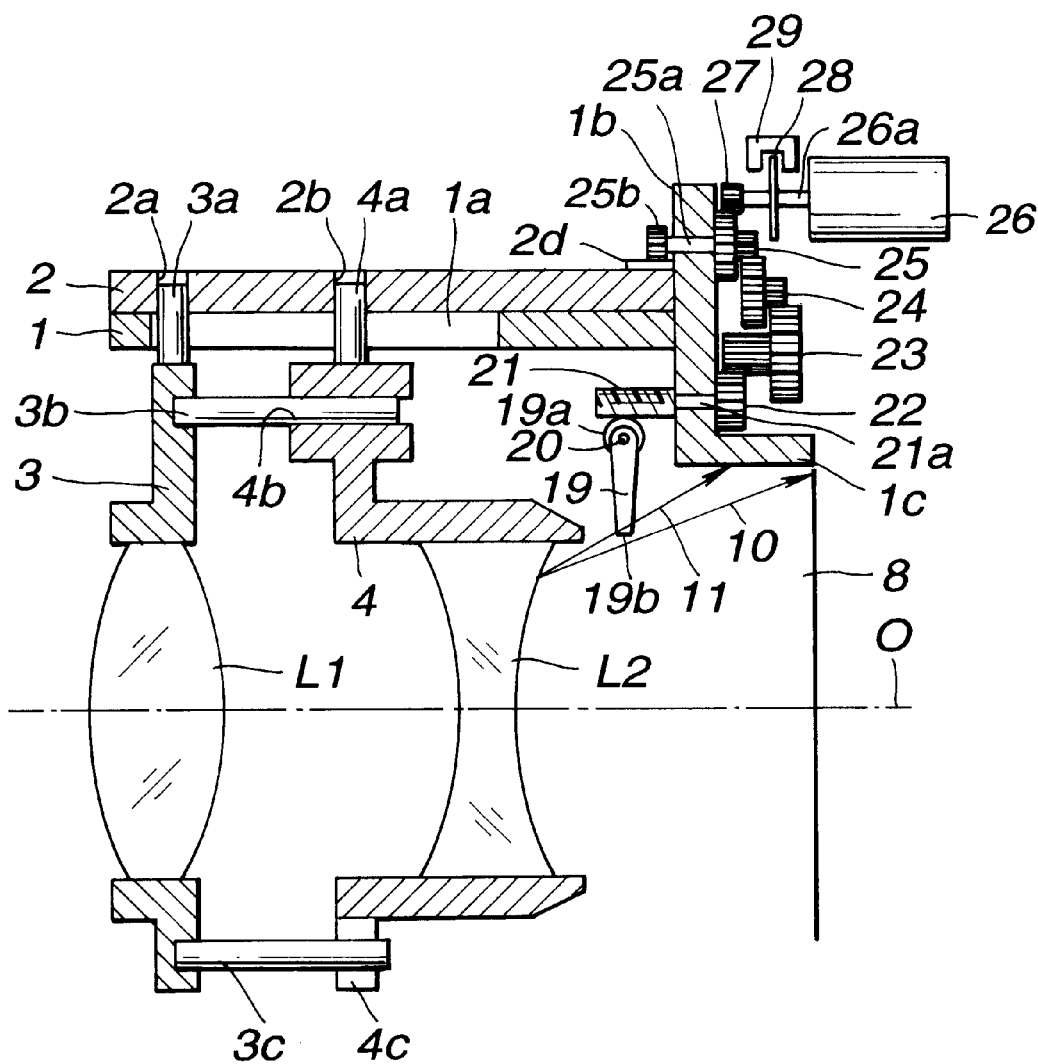
FIG. 16 is a cross-sectional view illustrating the lens barrel shown in FIG. 15 which is in a telephoto state.
Figure 17:
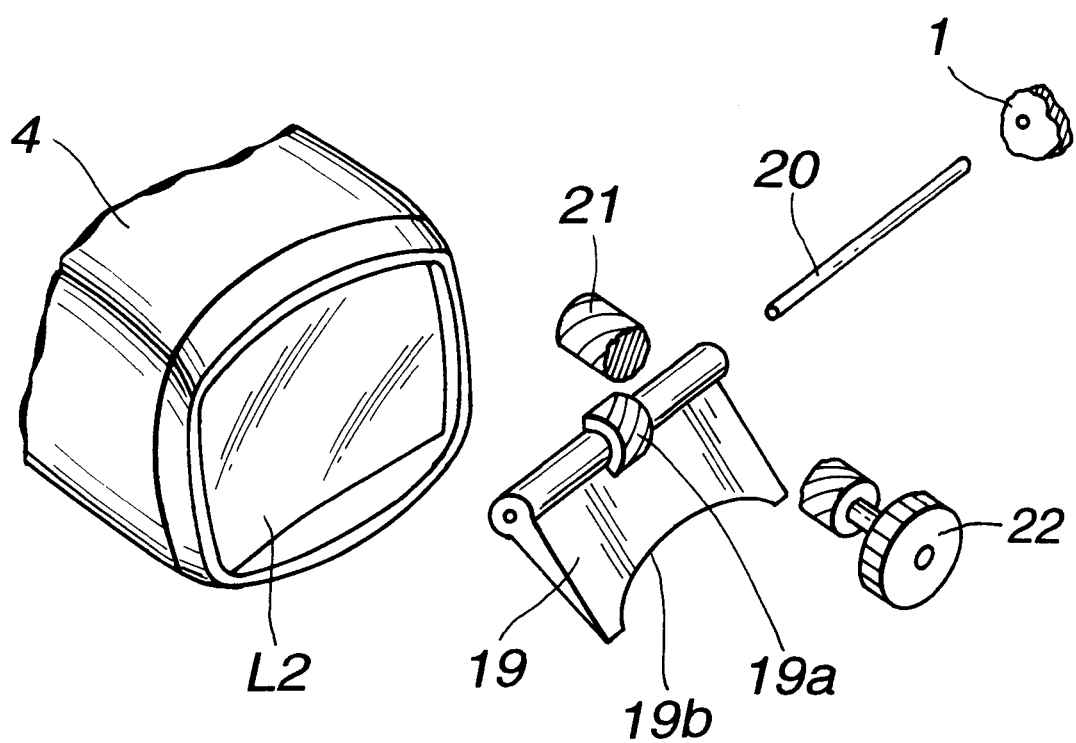
FIG. 17 is an exploded perspective view of a portion of the lens barrel illustrated in FIG. 15.
Figure 18:
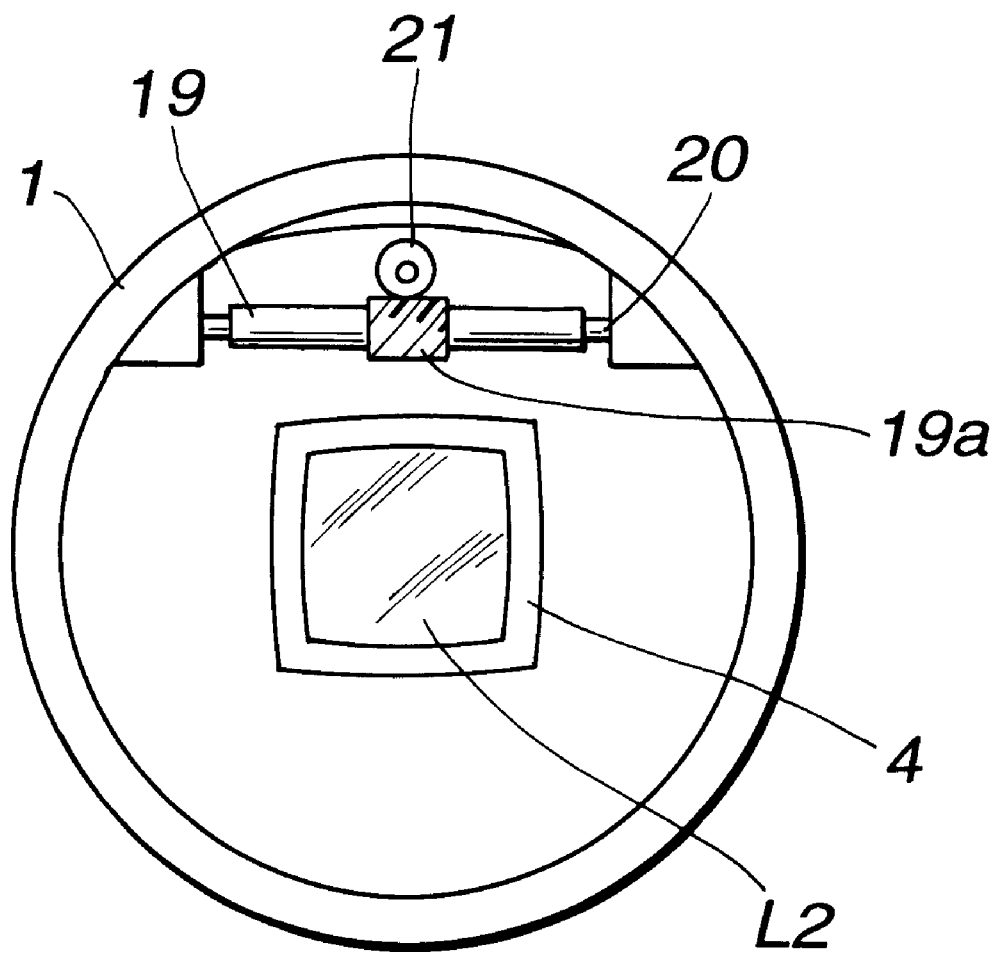
FIG. 18 is a cross-sectional view of a portion of the lens barrel illustrated in FIG. 15.

Next, a fifth embodiment of the lens barrel according to the present invention will be described with reference to FIGS. 15–18. FIG. 15 is a cross-sectional view illustrating the lens barrel according to the fifth embodiment which is in a wide-angle state; FIG. 16 is a cross-sectional view illustrating the lens barrel in a telephoto state; FIG. 17 is an exploded perspective view of a portion of the lens barrel; and FIG. 18 is a cross-sectional view of a portion of the lens barrel.

Since the lens barrel according to the fifth embodiment has substantially the same structure as the aforementioned first—fourth embodiments, the same members are designated by the same reference numerals, and a detailed description thereof is omitted.

A flare diaphragm 19 is pivotably supported by a shaft 20 which is fixed to a fixed frame 1. The outer periphery of a portion of the flare diaphragm 19, into which the shaft 20 is inserted, is formed with a gear 19a. The gear 19a is meshed with a worm gear 21 rotatably projecting from the flange 1b of the fixed frame 1.

An arc-shaped diaphragm edge 19b is formed at the lower end of the flare diaphragm 19, as illustrated in FIG. 17.

A diaphragm gear 22 is fixed coaxially with a coupling shaft 21a of the worm gear 21 at the back of the worm gear 21 beyond flange 1b. The diaphragm gear 22 is rotatably supported by the fixed flame 1, and meshed with a smaller diameter gear of a first coupling gear 23 rotatably supported by the flange 1b. Further, a larger diameter gear of the first coupling gear 23 is meshed with a smaller diameter gear of a second coupling gear 24 rotatably supported above the first coupling gear 23, while a larger diameter gear of the second coupling gear 24 is meshed with a smaller diameter gear of a third coupling gear 25 rotatably supported above the second coupling gear 24. Further, a larger diameter gear of the third coupling gear 25 is provided with a coupling shaft 25a extending through the flange 1b, and a driving gear 25b, meshed with a gear 2d formed around the outer periphery of a cam ring 2, is disposed at the front of the coupling shaft 25a. A larger diameter gear of the third coupling gear 25 is meshed with an output gear 27 coupled to an output shaft 26a extending from a motor 26.

Stated another way, the above-mentioned first coupling gear 23, second coupling gear 24, and third coupling gear 25 form a transmission gear train for transmitting a driving force from the motor 26 to the gear 19a of the flare diaphragm 19 and to the gear 2d of the cam ring 2.

A disk-shaped light shielding plate 28 formed with teeth around the periphery is disposed on the output shaft 26a of the motor 26, such that a driving amount of the motor 26 can be monitored by detecting the teeth of the light shielding plate 28 by a photo-interrupter 29.

Also, as illustrated in FIG. 18, the flare diaphragm 19 and the worm gear 21 are accommodated in a space provided by cutting a second lens frame 4 and a second lens group L2 in an oval shape.

In a wide-angle state as illustrated in FIG. 15, the flare diaphragm 19 is in a posture substantially parallel with the optical axis O. In this state, the flare diaphragm 19 is accommodated in the space provided by cutting the second lens frame 4 in an oval shape.

In the wide-angle state, the flare diaphragm 19 is rotated to a position substantially parallel with the optical axis, as illustrated. The diaphragm edge 19b is completely retreated from the optical path of the photographic optical system, so that a wide light beam 9 reaches a film 8.

In this state, as the motor 26 is rotated, the photo-interrupter 29 detects the rotation of the motor 26 to drive the cam ring 2 from the rotating position in the wide-angle state to a rotating position in a telephoto state. A driving force of the motor 26 is also transmitted to the worm gear 21 through the above-mentioned first coupling gear 23, second coupling gear 24, third coupling gear 25, and the diaphragm gear 22, whereby the flare diaphragm 19 is rotated about the shaft 20 in the counter-clockwise direction, so that the diaphragm edge 19b is moved behind the rear end surface of the second lens frame 4 as illustrated in FIG. 16.

In this state, while the telephoto light beam 10 passes below the diaphragm edge 19b and reaches the film 8, a deleterious light beam 11 having a large emitting angle is cut by the flare diaphragm 19 so that it does not reach the film 8.

In the fifth embodiment described above, the use of the motor ensures that the flare diaphragm can be driven. In addition, since the flare diaphragm and a portion of the mechanism required for the driving are disposed in the space provided by cutting the lens in an oval shape, the lens barrel can be reduced in size.

Generally, when a camera is positioned horizontally, the sun light is incident from the above. That is, the sun light is incident from an upper portion of the front end of the lens barrel and exits the lens barrel in a lower rear direction. It is therefore more effective if the flare diaphragm is disposed in a lower rear portion of the lens barrel. While the aforementioned respective embodiments have shown an example in which the flare diaphragm is disposed only in the upper half of the lens barrel, it goes without saying that the flare diaphragm may be disposed only in the lower half, or may be disposed in both of the upper half and the lower half.

What is claimed is:

1. A lens barrel comprising:

a moveable flare diaphragm disposed on an optical path of lenses or in a vicinity thereof such that said flare diaphragm respectively, advances in a direction toward and retreats in an opposite direction away from the optical path for cutting deleterious light responsive to said lenses moving in a projecting direction and a collapsing along an optical axis.

2. A lens barrel according to claim 1, wherein said flare diaphragm is adapted to advance and retreat responsive to a respective change in focal distance of said lens.

3. A lens barrel according to claim 1, wherein a moveable lens frame is used as a driving source for moving said flare diaphragm.

4. A lens barrel according to claim 3, wherein said movable lens frame has a cam surface and said flare diaphragm has a cam follower moved by said cam surface.

5. A lens barrel according to claim 1, wherein said flare member includes a cam follower engaging a cam provided in said lens barrel to move said flare diaphragm.

6. A lens barrel according to claim 1, wherein at least one point along the flare diaphragm remains stationary and another portion thereof moves into and out of the optical path.

7. The lens barrel according to claim 1, wherein the flare diaphragm moves along an arcuate path.

8. The lens barrel according to claim 1, wherein the flare diaphragm swings about a fixed pivot point.

9. A lens barrel comprising:
a flare diaphragm disposed on an optical path of lenses or in a vicinity thereof such that said flare diaphragm advances into and retreats from the optical path for cutting deleterious light responsive to said lenses moving in a direction of an optical axis,
wherein a driving motor for driving said lenses for zooming or focusing is used as a driving source of said flare diaphragm.

10. A lens barrel according to claim 9, wherein said flare member is swingably mounted about a pivot axis and further including gear means coupled between said driving motor and said flare diaphragm for moving said flare diaphragm during operation of said diving motor.

11. A lens barrel comprising:
a flare diaphragm disposed on an optical path of lenses or in a vicinity thereof such that said flare diaphragm advances into and retreats from the optical path for cutting deleterious light responsive to said lenses moving in a direction of an optical axis,
wherein said flare diaphragm is formed by a flexible member.

12. A lens barrel comprising:
a flare diaphragm disposed on an optical path of lenses or in a vicinity thereof such that said flare diaphragm advances into and retreats from the optical path for cutting deleterious light responsive to said lenses moving in a direction of an optical axis,
wherein said flare diaphragm is disposed in a space of D-shaped cut portion in the lenses which does not contribute to an effective light beam.

13. A lens barrel comprising:
a flare diaphragm disposed on an optical path of lenses or in a vicinity thereof such that said flare diaphragm advances into and retreats from the optical path for cutting deleterious light responsive to said lenses moving in a direction of an optical axis,
wherein said flare diaphragm is disposed only on a lower side of the optical axis in a rear portion of said lens barrel.

14. A lens barrel comprising:
a flare diaphragm disposed on an optical path of lenses or in a vicinity thereof such that said flare diaphragm advances into and retreats from the optical path for cutting deleterious light responsive to said lenses moving in a direction of an optical axis,
wherein said flare diaphragm has a center of rotation orthogonal to the optical axis, and advances into and retreats from the optical path by a rotating operation corresponding to a position of the lenses.

15. A lens barrel comprising:
lenses forming a photographic optical system;
a lens holding frame for holding said lenses, said lens holding frame being moved in a direction of an optical axis to perform a focal distance changing operation or a focusing operation for the photographic optical system; and
a moveable flare diaphragm respectively, advanced in a direction toward and retreated in an opposite direction away from a photographic optical path for cutting deleterious light in response to movements of said lens holding frame in opposite directions along the optical axis.

16. A lens barrel according to claim 15, wherein said flare diaphragm is disposed only on a lower side of the optical axis in a rear portion of said lens barrel.

17. A lens barrel according to claim 15, wherein at least one point along the flare diaphragm remains stationary and another portion thereof moves into and out of the optical path.

18. A lens barrel according to claim 15, wherein said flare diaphragm is advanced and retreated by movements of said lens holding frame in the direction of the optical axis caused by a change in focal distance of said lenses.

19. A lens barrel comparing:
lenses forming a photographic optical system;
a lens holding frame for holding said lenses, said lens holding frame being moved in a direction of an optical axis to perform distance changing operation or a focusing operation for photographic optical system;
a flare diaphragm advanced into and retreated from a photographic optical path for cutting deleterious light in response to movements of said lens holding frame in the direction of the optical axis,
wherein a driving motor for driving said lenses for zooming or focusing is used as a driving source of said flare diaphragm.

20. A lens barrel comprising:
lenses forming a photographic optical system;
a lens holding frame for holding said lenses, said lens holding frame being moved in a direction of an optical axis to perform a focal distance changing operation or a focusing operation for the photographic optical system; and
a flare diaphragm advanced into and retreated from a photographic optical path for cutting deleterious light in response to movements of said lens holding frame in the direction of the optical axis,
wherein said flare diaphragm is formed by a flexible member.

21. A lens barrel comprising:
lenses forming a photographic optical system;
a lens holding frame for holding said lenses, said lens holding frame being moved in a direction of an optical axis to perform a focal distance changing operation or a focusing operation for the photographic optical system; and a flare diaphragm advanced into and retreated from a photographic optical path for cutting deleterious light in response to movements of said lens holding frame in the direction of the optical axis, wherein said flare diaphragm is disposed in a space of a D-shaped cut portion in the lenses which does not contribute to an effective light beam.

22. A lens barrel comprising:

lenses forming a photographic optical system;

a lens holding frame for holding said lenses, said lens holding frame being moved in a direction of an optical axis to perform a focal distance changing operation or a focusing operation for the photographic optical system; and a flare diaphragm advanced into and retreated from a photographic optical path for cutting deleterious light in response to movements of said lens holding frame in the direction of the optical axis, wherein said flare diaphragm swings about a center of rotation orthogonal to the optical axis, and advances into and retreats from the optical path by rotating operations corresponding to a position of the lenses.

23. A lens barrel comprising:

a flare diaphragm disposed on an optical path of lenses or in the vicinity thereof such that said flare diaphragm advances into and retreats from the optical path for cutting deleterious light corresponding to said lenses moving in a direction of an optical axis, wherein a moveable lens frame is used as a driving source for moving said flare diaphragm, and wherein said flare diaphragm is formed by a flexible member, said movable lens frame having a cam surface for selectively engaging said flexible member responsive to a relative position of the movable lens frame along the optical axis.

* * * * *

UNITED STATES PATENT AND TRADEMARK OFFICE
CERTIFICATE OF CORRECTION

PATENT NO : 5,978,160
DATED : November 2, 1999
INVENTOR(S) : Tamotsu Koiwai and Tatsuya Suzuki It is certified that error appears in the above-identified patent and that said Letters Patent are hereby corrected as shown below:

ON THE FACE PAGE

Next to Section "[73] Inventors:", on the first line, delete "Akiruno".

Next to Section "[73] Inventors:", on the second line, after the word "Suzuki,", delete "Tokyo".

Next to Section "[73] Inventors:", on the second line, before the word "Japan", insert -- Tokyo --.

Under Section "[30] Foreign Application Priority Data", delete "H8-326822" and insert therefor -- H8-316822 --.

Under Section "FOREIGN PATENT DOCUMENTS", the first reference cited, delete "60-164414" and insert therefor -- 60-194414 --.

Signed and Sealed this

Twenty-second Day of May, 2001

*Attest:*

NICHOLAS P. GODICI

*Attesting Officer*   Acting Director of the United States Patent and Trademark Office